May 31, 1932.   M. PICOLLO   1,860,785
SECURITY DEVICE AGAINST ROBBERY OF MOTOR CARS
Filed Aug. 3, 1929
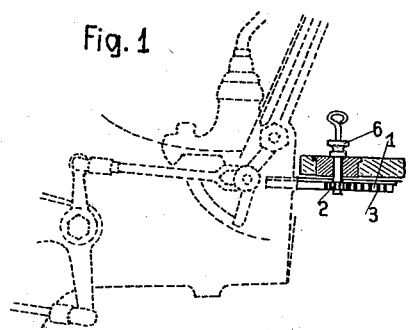
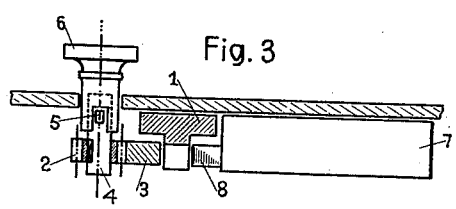
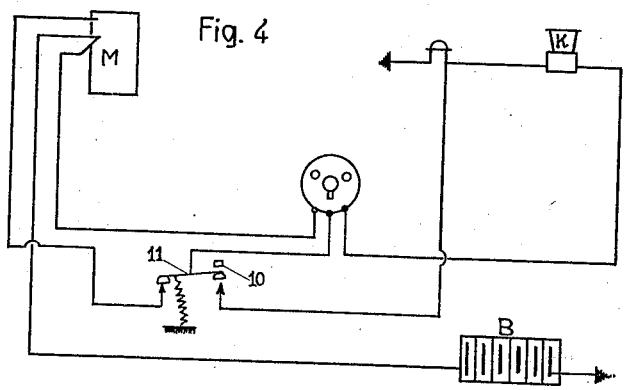
Inventor
Mario Picollo
By
Attorney Patented May 31, 1932

1,860,785

UNITED STATES PATENT OFFICE

MARIO PICOLLO, OF TURIN, ITALY

SECURITY DEVICE AGAINST ROBBERY OF MOTOR CARS

Application filed August 3, 1929, Serial No. 383,307, and in Italy August 9, 1928.

This invention relates to a security device adapted to prevent robbery of motor cars, and has for its object to provide a device of the kind referred to, comprising a mechanical stopping device acting on the brake operating system of the car, said device being preferably adapted to control an electric security or "alarm" arrangement, the electrical equipment of the car being suitably modified in accordance therewith.

According to the invention, the mechanical device consists of a displaceable member adapted to lock the brake levers in their "on" position and to be locked by the spring operated bolt of a lock, the latter being capable of being released only by means of its key proper; said member, during its travel to its said locking position, preferably operating a change-over switch in the electrical equipment of the car in order to commute a line thereof over the usual electrical horn or claxon of the car.

According to the invention, the change-over switch may be inserted in the circuit either of the starting motor or of the ignition distributor, so that on operating the starting button of the motor the horn will be caused to ring.

In the annexed drawings, showing by way of example and diagrammatically one way of carrying out this invention, as applied to a car having front and rear brakes, Fig. 1 is a side view of the security device, viewed as a whole on an engine-and-gear box body of a car, Fig. 2 is a plan view on an enlarged scale of the device, Fig. 3 is a cross sectional view according to III—III of Fig. 2, and Fig. 4 is a partial electric diagram of the supply circuits of the car, as modified for use in connection with the invention.

Referring to the drawings, 1 is a displaceable member adapted for instance to be operated by means of a pinion 2 and rack 3 fixed thereon, so as to be brought to lock the brake levers in their "on" position, against the action of a spring 12. In the embodiment shown, the pivot 4 of the pinion 2 is provided with a cross pin 5 and is operable by means of a button or handle 6 upwardly projecting through the floor of the car so as to be within easy reach of the driver, said button having a bushing with a suitable bayonet slot engaging said pin. Sideways of the slidable member a lock 7 is provided, having its bolt 8 adapted to abut against the side of the member 1 during its operative travel in the direction shown by the arrow in Fig. 2, and to engage a stop on the slide, as for instance to enter an opening 9 in the flange of the slide, said bolt being preferably automatically moved to its stop engaging position by the action of a spring (not shown).

During its travel in the direction of the arrow the locking member 1 may operate, say through a projecting pin 10, a change-over switch 11 so as to modify the electrical circuit on the car. Said circuit, as well as the change-over device to be used, are shown only diagrammatically in Fig. 4 and may be of any suitable design.

The operation is as follows:

Once the brakes are applied, the button 6 is operated so as to displace the member 1 in the direction indicated by the arrow in Fig. 2, so as to bring it in the path of some movable member of the brakes, and/or to cooperate therewith, when the bolt 8 will engage the stop in the member 1. Preferably the slidable member is made to abut against the rocking lever simultaneously operating both the front and rear brakes.

At the same time, due to the displacement of member 1, the part 10 will operate the change-over switch 11, so that the latter will commute the electric horn K in the circuit of the starting motor M, over the supply battery B.

Obviously, in a car having ignition distributor the change takes place from the ignition wire to the horn wire.

Any attempt to operate the car by starting the motor will then cause the horn to toot, giving the alarm; at the same time it will not be possible to actually excite the starting motor and to have the engine started.

When it is desired to put the car in the usual operative conditions it will be sufficient to release the lock 7, thus causing the bolt 8 to be disengaged from the member 1, so that all the parts under the action of spring 12 will take again their starting position. The brakes will thus be once more releasable by the normal action of the brake lever, and the normal ignition circuit being restored, as shown in Fig. 4, it will be possible to operate the starter and to supply the ignition distributor.

The operative end of the slidable member 1 may be provided with an adjustable head, so that the length of member 1 may be adjusted according to the variations in the stroke of the rocking levers of the brakes, as well as, according to conditions to be met in the different kinds of motor cars to which the device of the invention is to be applied.

If desired, the mechanical device shown in Figures 1, 2 and 3 may be used independently of the modification in the electric equipment shown in Fig. 4, without departing from the scope of the invention.

I claim:

1. In a motor car a rocking lever of the brake operating system, a bar slidable in the plane of movement of said lever, adapted to obstruct the return movement of said lever from its "on" to its "off" position, a rack integral with said bar, a pinion engaging and operating said rack, means for locking said device in its operative position, a spring automatically returning said movable member to its inoperative position, when said member is released by said locking means, and a knob projecting through the floor of said car for operating said pinion.

2. In a motor car a rocking lever of the brake operating system, a bar slidable in the plane of movement of said lever, adapted to obstruct the return movement of said lever from its "on" to its "off" position, a rack integral with said bar, a pinion engaging and operating said rack, a stop on said bar, a lock comprising a bolt movable transversely of said bar, adapted to engage said stop when said bar is moved to its operative position, and a knob projecting through the floor of said car for operating said pinion.

3. In a motor car a rocking lever of the brake operating system, a bar slidable in the plane of movement of said lever, adapted to obstruct the return movement of said lever from its "on" to its "off" position, a rack integral with said bar, a pinion engaging and operating said rack, a stop on said bar, a lock comprising a spring actuated bolt movable transversely of said bar, adapted to automatically engage said stop when said bar is moved to its operative position, a spring automatically returning said bar to its inoperative position when said bar is released by said bolt, and a knob projecting through the floor of said car for operating said pinion.

MARIO PICOLLO.